United States Patent
Qiao

(10) Patent No.: US 8,363,311 B2
(45) Date of Patent: Jan. 29, 2013

(54) OPTICAL AMPLIFIER AND A METHOD OF LIGHT AMPLIFICATION

(76) Inventor: Lijie Qiao, Ottawa (CA)

( * ) Notice: Subject to any disclaimer, the term of this patent is extended or adjusted under 35 U.S.C. 154(b) by 465 days.

(21) Appl. No.: 12/645,541

(22) Filed: Dec. 23, 2009

(65) Prior Publication Data

US 2010/0245986 A1 Sep. 30, 2010

Related U.S. Application Data

(60) Provisional application No. 61/164,214, filed on Mar. 27, 2009.

(51) Int. Cl.
*H04B 10/17* (2006.01)
*H04B 10/12* (2006.01)

(52) U.S. Cl. ........... 359/341.41; 359/341.42; 359/341.3; 359/341.33

(58) Field of Classification Search ............. 359/341.41, 359/341.42, 341.3, 341.33
See application file for complete search history.

(56) References Cited

U.S. PATENT DOCUMENTS

| | | | | |
|---|---|---|---|---|
| 6,052,219 A | * | 4/2000 | Kidorf et al. | 359/334 |
| 6,064,514 A | * | 5/2000 | Aoki et al. | 359/341.43 |
| 6,233,385 B1 | * | 5/2001 | Taneda et al. | 385/122 |
| 6,738,184 B2 | * | 5/2004 | Hayashi et al. | 359/341.4 |
| 7,511,881 B2 | | 3/2009 | Ahn et al. | 359/337.2 |
| 2002/0101652 A1 | * | 8/2002 | Hayashi et al. | 359/341.4 |
| 2007/0127112 A1 | * | 6/2007 | Machida et al. | 359/337 |
| 2008/0310858 A1 | * | 12/2008 | Lu et al. | 398/158 |

OTHER PUBLICATIONS

Inoue, "Gain-Clamped Fiber Amplifier with a Short Length of Preamplification Fiber", IEEE Photonics Technology Letters, vol. 11, No. 9, pp. 1108-1110, 1999.
Ahn et al., "All-Optical Gain-Clamped Erbium-Doped Fiber Amplifier With Improved Noise Figure and Freedom From Relaxation Oscillation", IEEE Photonics technology Letters, vol. 16, No. 1, pp. 84-86, 2004.

* cited by examiner

*Primary Examiner* — Eric Bolda
(74) *Attorney, Agent, or Firm* — Teitelbaum & MacLean; Neil Teitelbaum; Doug MacLean

(57) ABSTRACT

An optical amplifier has a pump and an "anti-pump" for reducing a variation of the amplifier gain with the input optical power. The wavelength of "anti-pump" light is longer than the wavelength of the optical signal being amplified, so that the optical signal serves as a pump for the "anti-pump" light, whereby an optical loss variation with the signal power at the signal wavelength is created, which reduces optical gain variation with the signal power. To compensate for gain loss due to the anti-pump light, two and three stages of amplification can be used.

16 Claims, 7 Drawing Sheets

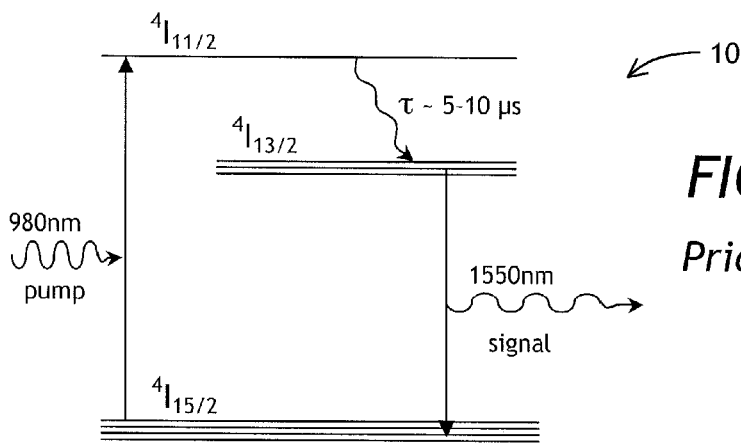
*FIG. 1*
Prior Art
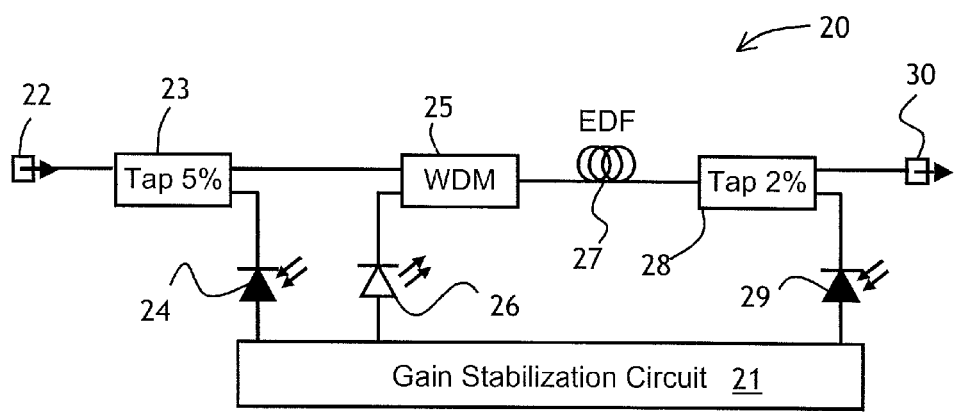
*FIG. 2* - Prior Art
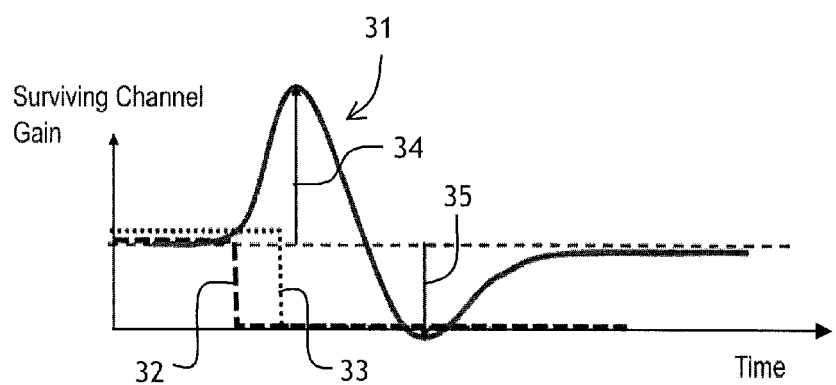
*FIG. 3*
Prior Art

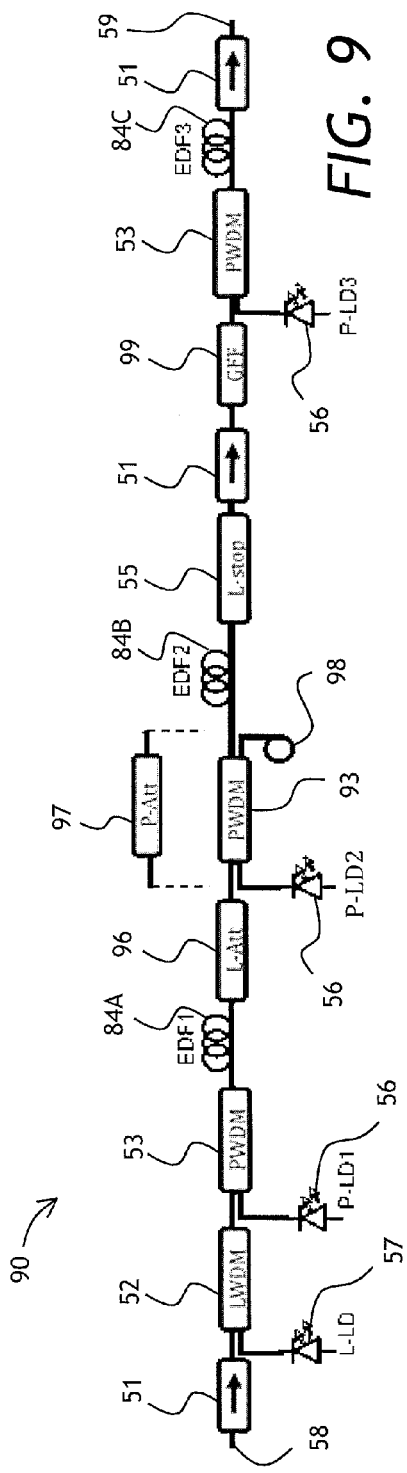
FIG. 9
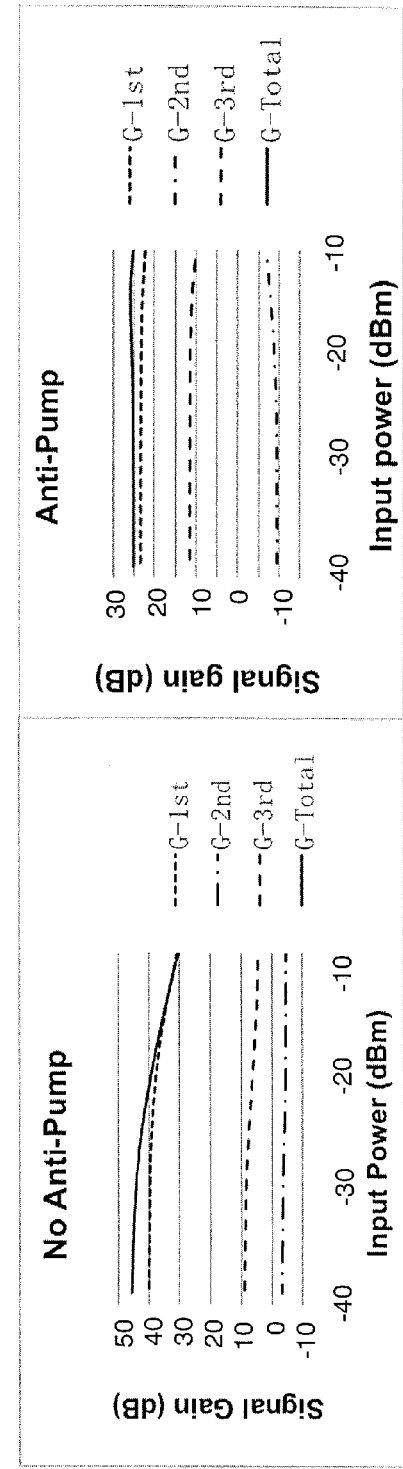
FIG. 10B
FIG. 10A

OPTICAL AMPLIFIER AND A METHOD OF LIGHT AMPLIFICATION

CROSS-REFERENCE TO RELATED APPLICATIONS

The present invention claims priority from the provisional application No. 61/164,214 filed Mar. 27, 2009, which is incorporated herein by reference.

TECHNICAL FIELD

The present invention relates to optical amplifiers, and in particular to gain-stabilized optical amplifiers and methods of stabilizing gain of optical amplifiers.

BACKGROUND OF THE INVENTION

In a wavelength division multiplexing (WDM) optical transmission system, optical signals at a plurality of wavelengths are encoded with digital streams of information. These encoded optical signals, or optical channels, are combined together and transmitted through a series of spans of an optical fiber comprising a transmission link of a WDM fiberoptic network. At a receiver end of the transmission link, the optical channels are separated, whereby each optical channel can be detected by an optical receiver.

While propagating through an optical fiber, light tends to lose power. Yet some minimal level of optical channel power is required at the receiver end to decode information that has been encoded in an optical channel at the transmitter end. To boost optical signals propagating in an optical fiber, optical amplifiers are deployed at multiple locations, known as nodes, along the transmission link. The optical amplifiers extend the maximum possible length of the link, in some instances, from a few hundred kilometers to several thousand kilometers, by amplifying optical signals to power levels close to the original levels of optical power at the transmitter end.

An erbium-doped fiber amplifier (EDFA) is one of the most practical types of optical amplifiers employed in many modern fiberoptic networks. A single EDFA module can amplify up to about a hundred of optical channels at a time, thus providing significant cost savings. One of the main components of an EDFA is a length of an active optical fiber having a core doped with ions of a rare earth element such as erbium. In operation, the erbium doped fiber (EDF) is optically pumped by using a suitable pump such as a laser diode, so as to create a population inversion between energy states of the erbium ions comprising a gain medium of the EDF. Referring to FIG. 1, an energy diagram 10 of an erbium ion is presented. The pump light at 980 nm is used to excite the erbium ion from the ground state $^4I_{15/2}$ into the excited state $^4I_{11/2}$. A transition to the state $^4I_{13/2}$ occurs spontaneously with a time constant $\tau$ of 5-10 us. As a result, a population inversion between the states $^4I_{13/2}$ and $^4I_{15/2}$ is created.

Once the population inversion occurs, the gain medium begins to amplify an optical signal having a wavelength of approximately 1550 nm+/−20 nm propagating along the core of the EDF. The optical signal comprises a plurality of individual optical channels. The gain medium is characterized by a wavelength-dependent gain coefficient, from which amplification coefficients of these optical channels can be determined. During the amplification process, the optical power of the pump is absorbed by the gain medium, which simultaneously amplifies all the optical channels present. The amplification coefficient of a particular channel depends on the optical power and the number of optical channels present, and on the optical power of the pump light. When the number of optical channels changes suddenly, for example, due to adding, dropping, or routing of some of the optical channels, the gain coefficient of the gain medium of the EDF changes as well, which impacts the amplification coefficient of the rest of the optical channels. This phenomenon is highly detrimental because it affects reliability and the bit error rate (BER) of fiberoptic communications links.

To overcome the gain sensitivity to optical power of the signal, various techniques of gain stabilization of an optical amplifier have been developed. At least two types of such techniques exist to date. The techniques of the first type involve detecting input and, or output optical power levels of an optical amplifier and using an electronic feedback loop to adjust the optical pumping levels in the optical amplifier, so as to compensate for optical gain variation.

Turning to FIG. 2, a block diagram of a prior-art optical amplifier 20 of the first type having a gain stabilization circuit 21 is shown. An optical signal coupled to an input port 22 of the optical amplifier 20 is split using a 5% optical tap 23, and the tapped signal is directed to a photodiode 24 for measuring input optical power level, which is used to generate a so called "feed-forward" control signal. A wavelength division multiplexor (WDM) 25 is used to couple light emitted by a pump laser diode 26, together with the optical signal, into an EDF 27, which amplifies the signal as explained above. The output signal is tapped off by an output 2% tap 28 for measuring the output optical power level using a photodiode 29, which is used to generate a so-called "feedback" control signal. Then, the amplified optical signal is directed towards an output port 30. The gain stabilization circuit 21 adjusts the driving current of the pump laser diode 26 based on the feed-forward and feedback signals, so as to stabilize the overall gain of the optical amplifier 20.

Unfortunately, the prior-art gain-stabilized optical amplifier 20 suffers from transient gain fluctuation effects. Referring now to FIG. 3, a time dependence 31 of optical gain of the prior-art optical amplifier 20 of FIG. 2 is shown. When input optical power level changes abruptly as shown at 32, and the optical pumping level is adjusted as shown at 33, the optical gain 31 undergoes an overshoot 34 and an undershoot 35. One fundamental reason of existence of overshoot 34 and the undershoot 35 in the time dependence 31 of the optical gain is a finite transition time $\tau$ of 5-10 µs between erbium energy levels $^4I_{11/2}$ and $^4I_{13/2}$ shown in FIG. 1. Due to the finite transition time $\tau$, the population inversion between the levels $^4I_{13/2}$ and $^4I_{15/2}$ does not changes instantly, even when the optical pumping level 33 is changed very quickly after the input power change 32 is detected. Thus, the techniques of first type generally have an inherent drawback of exhibiting transient gain variation, which is difficult to suppress using feed-forward and/or feedback control signals.

The techniques of the second type attempt to directly stabilize the gain of the amplifying medium. These techniques are commonly referred to as "gain clamping". One well-known prior-art method of gain clamping is to create a lasing cavity in an optical amplifier. In an article entitled "Gain-Clamped Fiber Amplifier with a Short Length of Preamplification Fiber" by Kyo Inoue, *IEEE Photonics Technology Letters*, v. 11, No. 9, 1999, which is incorporated herein by reference, an optical amplifier gain-clamped by a ring laser cavity is described. The gain is stabilized because the roundtrip optical losses of a continuously emitting laser equal the roundtrip gain in the amplifying medium. When the losses stay constant, the gain stays constant and therefore the population inversion stays constant. Unfortunately, the transient effects are still present in laser-based gain stabilized amplifiers because of transient effects in the lasing cavity itself. The transient effects in the lasing cavity are observed upon an abrupt change of the input optical power. Furthermore, lasing-based gain stabilization techniques generally suffer from a drawback of increased optical noise in the output optical signal.

In U.S. Pat. No. 7,511,881 entitled "Amplified Spontaneous Emission Reflector-Based Gain-Clamped Fiber Amplifier" by Ahn et al., which is incorporated herein by reference, a gain-clamped optical fiber amplifier is described. The gain of the optical amplifier of Ahn et al. is stabilized by using an optical interleaver coupled to a mirror for reflecting amplified spontaneous emission (ASE) back into the amplifier. The optical power of ASE decreases when the input signal power increases, and vice versa, so that when ASE is reflected back into the amplification medium, the gain is stabilized. Disadvantageously, about a half of the usable amplifier bandwidth is lost due to having to spectrally separate ASE from the signal using the optical interleaver.

The prior art, therefore, is lacking a practical, full-bandwidth, transient-suppressed, gain-stabilized optical amplifier. Accordingly, it is a goal of the present invention to provide such an optical amplifier; in particular, an amplifier having reduced variation of the optical gain with the signal power.

SUMMARY OF THE INVENTION

In accordance with the invention there is provided an optical amplifier for amplifying an optical signal having a signal wavelength and a signal power, the optical amplifier having an amplifier gain, the optical amplifier comprising:

an optical medium doped with a rare earth element;
an optical pump for pumping the optical medium with a pump light, whereby an optical gain at the signal wavelength is created in the optical medium, wherein the optical gain is dependent on the signal power; and
an optical anti-pump for pumping the optical medium with an anti-pump light at an anti-pump wavelength longer than the signal wavelength, so as to create a dependence of an optical loss in the optical medium on the signal power, substantially compensating the dependence of the optical gain on the signal power, and thereby lessening a variation of the amplifier gain with the signal power.

In accordance with another aspect of the invention there is further provided a method for lessening a gain compression in an optical amplifier for amplifying an optical signal having a signal wavelength and a signal power, the optical amplifier having a rare earth element doped optical medium and an optical pump for pumping the optical medium at a pump wavelength, for inducing an optical gain in the optical medium, wherein the optical gain exhibits a first variation with the signal power, the method comprising:
pumping the optical medium at an anti-pump wavelength longer than the wavelength of the optical signal, for inducing a second variation of optical gain with the signal power, which is substantially complementary to the first variation, whereby the gain compression in the waveguide amplifier is lessened, wherein a pumping power level at the anti-pump wavelength is substantially independent of a transient change of the signal power.

BRIEF DESCRIPTION OF THE DRAWINGS

Exemplary embodiments will now be described in conjunction with the drawings in which:

FIG. 1 is a prior-art energy diagram of an erbium ion;
FIG. 2 is a block diagram of a prior-art optical amplifier having a gain stabilization circuit;
FIG. 3 a time trace of optical gain of the prior-art optical amplifier of FIG. 2;
FIG. 9 is a block diagram of an embodiment of a three-stage amplifier of the present invention;
FIGS. 10A and 10B are graphs of calculated optical gain versus signal power of the amplifier of FIG. 9 at zero and non-zero levels of pumping at an anti-pump wavelength, respectively.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 4:
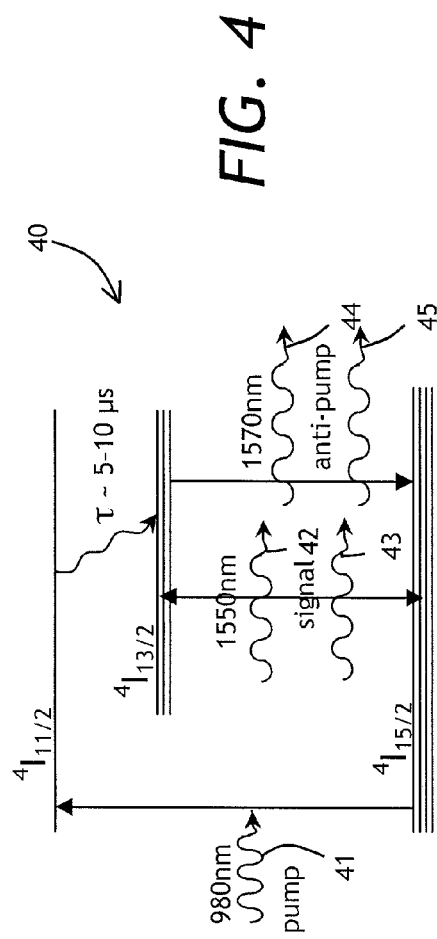
FIG. 4 is an energy diagram of an erbium ion showing signal, pump, and anti-pump photons according to the present invention.

Referring to FIG. 4, an energy diagram 40 of an erbium ion is presented. A pump photon 41 at 980 nm excites the erbium ion from the ground state $^4I_{15/2}$ into the excited state $^4I_{11/2}$. A transition to the state $^4I_{13/2}$ occurs spontaneously with a time constant τ of 5-10 µs. From this state, the erbium ion can return to the ground state $^4I_{15/2}$ by emitting a signal photon 43 in phase with another signal photon 42 at 1550 nm, thereby amplifying the signal light via stimulated emission of the photon 43. According to the present invention, an "anti-pump" photon 44 at 1570 nm is provided. When the erbium ion has returned to the ground state $^4I_{15/2}$, a signal photon can be absorbed by the erbium ion, bringing the ion to the state $^4I_{13/2}$. From this state, the erbium ion can return to the ground state $^4I_{15/2}$ by emitting another anti-pump photon 45 in phase with the anti-pump photon 44 at 1570 nm, thereby amplifying the anti-pump light. In other words, the optical signal functions as pump for the anti-pump light. This mechanism prevails at low levels of pumping with "anti-pump" light and at high signal power levels.

When an optical medium doped with erbium ions is pumped at 980 nm, an optical gain at 1550 nm is created in the optical medium. This optical gain is dependent on the signal power at 1550 nm. At a higher signal power the population inversion between the levels $^4I_{13/2}$ and $^4I_{15/2}$ is reduced, so the optical gain is reduced. This phenomenon, called the gain compression, is well-known and is detrimental as explained above. To mitigate the gain compression according to the present invention, an optical "anti-pump" is provided for pumping the optical medium with "anti-pump" light at a longer wavelength than the wavelength of the signal, in this case 1570 nm, and at a predetermined optical power level. The anti-pump light reduces the population inversion and, therefore, it reduces the optical gain. As the signal power increases, the signal starts to function as a pump for the anti-pump light, whereby a dependence of the optical loss induced by the anti-pump on the signal power is created that substantially compensates for the dependence of the optical gain on the signal power. As a result, a variation of the amplifier gain with the signal power is lessened and the gain compression is reduced. In other words, pumping the optical medium at an anti-pump wavelength longer than the wavelength of the optical signal induces a variation of optical gain with the signal power, which is substantially complementary to the variation of the optical gain induced by the pump, whereby the gain compression in the waveguide amplifier is lessened.

Figure 5:
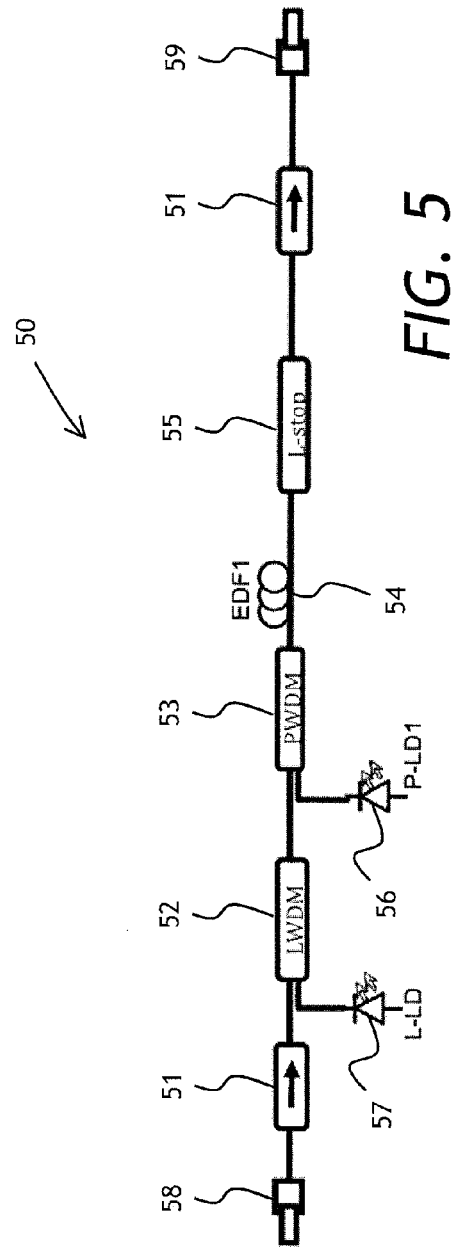
FIG. 5 is a block diagram of a single-stage optical amplifier according to the present invention.

Referring now to FIG. 5, a block diagram of an optical amplifier of the present invention is shown. The optical amplifier 50 has a consecutively coupled isolator 51, an anti-pump wavelength division multiplexor (WDM) 52 denoted as "LWDM", a pump WDM ("PWDM") 53, an erbium doped fiber (EDF) 54, an L-stop filter 55 for blocking light at an anti-pump wavelength, and another (output) isolator 51. A pump laser diode 56 and an "anti-pump" laser diode 57 are used to pump the EDF 54 through the PWDM 53 and the LWDM 52 with pump and "anti-pump" light, respectively. In operation, an optical signal coupled to an input port 58 propagates through the EDF 54, wherein it is amplified or attenuated, depending on pumping conditions, and directed to an output port 59. The quantum mechanism of amplification or attenuation of an optical signal by a medium containing erbium ions in presence of the pump and the anti-pump light has been described above and illustrated in FIG. 4. Even though the EDF 54 is shown forward-pumped in FIG. 5, backward pumping and/or backward anti-pumping can be used as well.

Figure 6A:
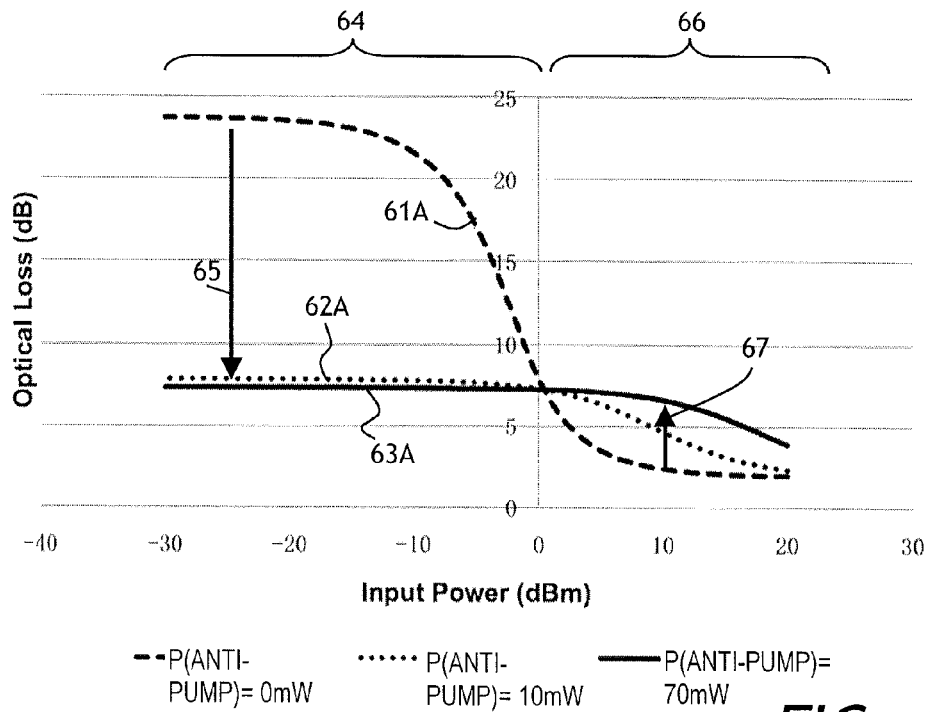
FIGS. 6A and 6B are graphs of calculated attenuation and optical gain, respectively, as a function of signal power at different levels of pumping at an anti-pump wavelength in the optical amplifier of FIG. 5.

The lessening the amplifier gain variation of the optical amplifier 50 with signal power has been verified by a computer simulation using VPI Transmission Maker™ software produced by VPI Systems, New Jersey, USA. Referring to FIG. 6A, a graph of optical signal attenuation in the EDF 54, in the absence of pump light by the pump laser diode 56, is presented. The attenuation is plotted as a function of signal power at different power levels of pumping the EDF 54 by the anti-pump laser diode 57 at the wavelength of 1570 nm. The EDF 54 fiber type used in the simulation was MP980, which is an industry standard EDF. The signal attenuation at anti-pump optical power of 0 mW, 10 mW, and 70 mW is shown at 61A, 62A, and 63A, respectively. The attenuation plot 61A represents attenuation of an optical signal in the EDF 54, wherein the attenuation drops because of an absorption saturation effect. At about −10 dBm of signal power and higher, the absorption is reduced at a high rate, as the plot 61A indicates. At about +3 dBm, the rate slows down, so that at about +10 dBm, the EDF appears saturated. Presence of 10 mW of the anti-pump light results in a dramatic reduction of attenuation in a low signal power sub-range 64 as shown by an arrow 65. The attenuation of the optical signal in a high signal power sub-range 66 of the signal power range is increased as shown by an arrow 67. At 70 mW of the anti-pump light, the attenuation slope is further reduced, as the plot 63A indicates. Thus, in the sub-range 64, the prevailing mechanism of changing attenuation is saturation of absorption. In the sub-range 66, the prevailing mechanism is a transfer of energy from the signal light to the anti-pump light. Generally, the power and the wavelength of the anti-pump light injected into the optically pumped EDF 54 are selected to reduce variation of optical gain with signal power.

Figure 6B:
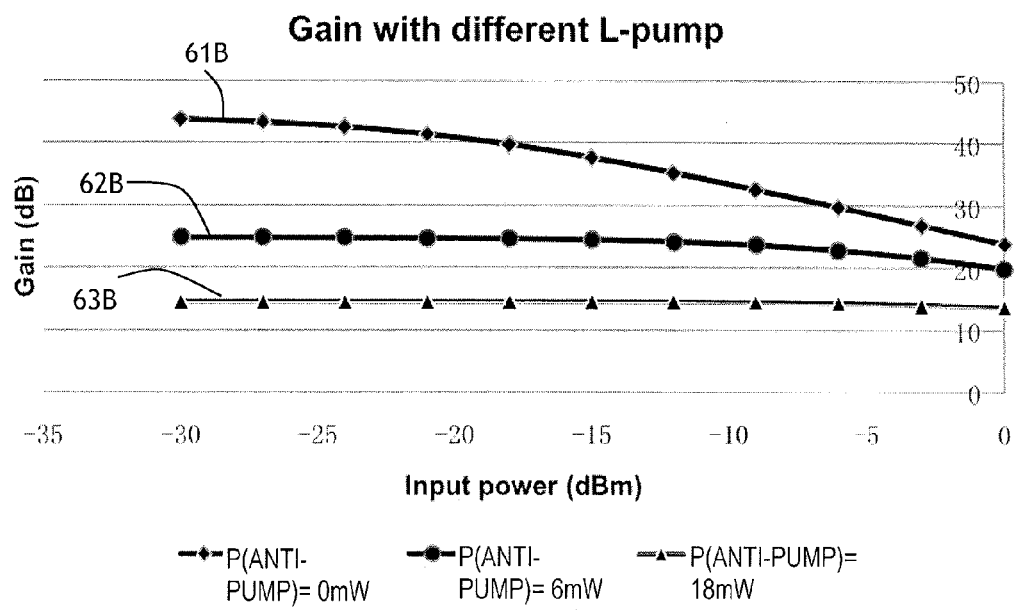

Turning now to FIG. 6B, a calculated dependence of optical gain on the signal power of the EDF 54 pumped by the pump laser diode 56 is shown. The pump wavelength was taken to be 980 nm and the pump optical power was taken to be 500 mW. The gain is plotted as a function of signal power at different levels of pumping the EDF 54 by the anti-pump laser diode 57 at the anti-pump wavelength of 1570 nm. Curves 61B, 62B, and 63B correspond to the anti-pump power levels of 0 mW, 6 mW, and 18 mW, respectively. It is seen that the presence of 18 mW of anti-pump light substantially removes about 20 dB of gain variation with signal power, considerably reducing the gain compression effect, although a strong gain reduction from 42 dB to 12 dB is observed as well.

Figure 7:
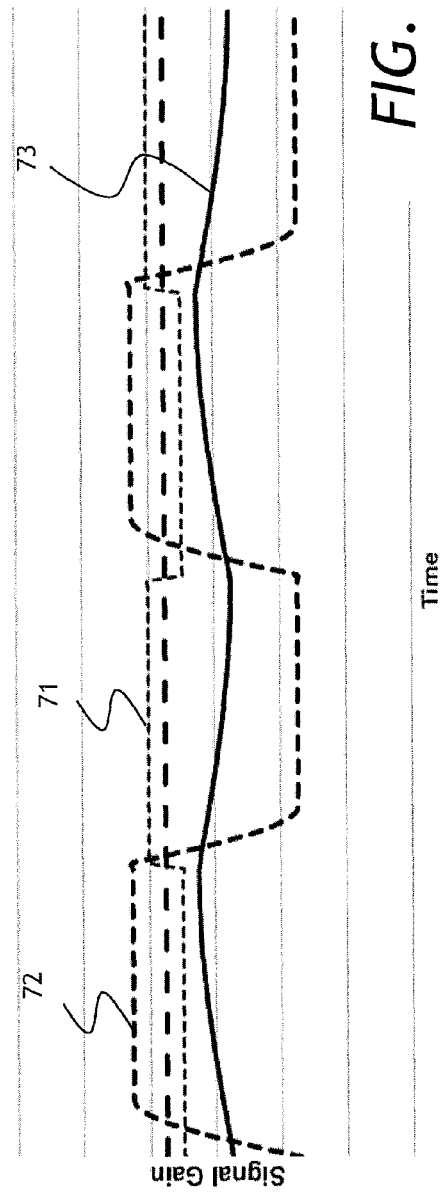
FIG. 7 is a time trace of a transient change of the optical gain of the amplifier of FIG. 5 with and without anti-pump light.

Introduction of the anti-pump 57 into the optical amplifier 50 of the present invention results in stabilization of the population inversion in the EDF 54 of the amplifier 50. Since the population inversion is stabilized, transient gain variations are reduced. Referring to FIG. 7, time traces of optical gain of the amplifier 50 without anti-pump 57 and with anti-pump 57 are plotted at a same scale. Pump power is kept constant in both cases. When signal power varies as shown at 71, optical gain 72 varies to a large extent in the absence of the anti-pump light. Advantageously, upon switching on the anti-pump laser diode 57, optical gain variation of the amplifier 50 is considerably reduced as seen at 73.

According to the present invention, the pumping power level at the anti-pump wavelength is substantially independent on a transient change of the signal power. In other words, no feed-forward or feed-back signals are required, and the anti-pumping power level is kept constant. The anti-pump wavelength and, or the pumping power level at the anti-pump wavelength are pre-determined so as to lessen the gain compression for an optical signal having a pre-determined wavelength range and, or a pre-determined signal power range. These parameters can also be optimized to lessen transient effects and, or polarization hole burning effects in the optical amplifier, because these effects are related to variation of population inversion underlying the gain sensitivity to the signal power levels. Nonetheless, the pump and anti-pump power levels can also be made adjustable during operation of the amplifier, based on an average input and, or output signal power measured, for further improvement of optical performance of the amplifier 50.

The pump wavelength of the pump laser diode 56 is in the range of 980+/−20 nm or 1480+/−20 nm, and the "anti-pump wavelength" of the anti-pump laser diode 57 is between 1565 nm and 1620 nm. Generally, the pump wavelength is shorter than the signal wavelength; however, multiphoton pumping, at which the pump wavelength is longer than the signal wavelength, is possible. For different doping materials, these wavelengths will of course be different. Erbium, ytterbium, and thallium doped optical media can be used, for example, as amplifying doping materials. More than one doping material can be used in the same amplification medium. Further, not only optical fibers but other types of optical waveguides, for example planar waveguides, can be used. Furthermore, amplification coefficient of free-space optical amplifiers can also be stabilized by using the anti-pumping technique described herein.

Figure 8:
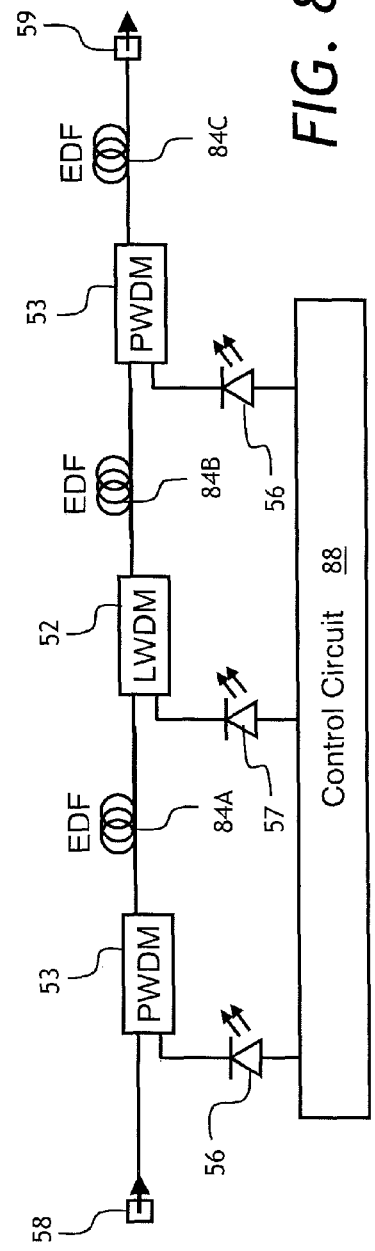
FIG. 8 is a generalized block diagram of a three-stage amplifier of the present invention.

As seen in FIG. 6B, the stabilized gain of the single-stage amplifier 50 is only about 12 dB, due to a considerable gain reduction by the anti-pump light. The gain reduction can be compensated for by implementing a multi-stage optical amplifier. Referring to FIG. 8, a general block diagram of a three-stage amplifier 80 of the present invention is shown. The amplifier 80 has erbium doped fiber (EDF) having segments 84A, 84B, and 84C, two pump WDM ("PWDM") 53, the anti-pump WDM ("LWDM") 52, two pump laser diodes 56, and the "anti-pump" laser diode 57. A control circuit 88 provides driving currents and temperature stabilization to the laser diodes 56 and 67. In operation, the PWDMs 53 and the LWDM 52 are used to couple light from the pump and the anti-pump laser diodes 56 and 57, respectively. An input optical signal coupled to the input port 58 propagates consecutively in the EDF segments 84A, 84B, and 84C, reaching the output port 59. The consecutively coupled EDF segments 84A, 84B, and 84C form a preamplifier section, a gain compensation section, and a final amplifier section of the optical amplifier 80, respectively. In the EDF segments 84A and 84C, the optical signal is amplified; and in the EDF segment 84B, the optical signal is partially attenuated due to pumping the section 84B with "anti-pump" light emitted by the anti-pump laser diode 57. The optical powers of the laser diodes 56 and 57 are selected so that the variation of the total amplifier gain of the amplifier 80 with signal power is lessened. An L-band amplified spontaneous emission (ASE) source can be used in place of the anti-pump laser diode 57.

Referring now to FIG. 9, a block diagram of one embodiment of a three-stage optical fiber amplifier 90 of the present invention is shown. The amplifier 90 has the input port 58, the output port 59, the EDF having the sections 84A, 84B, and 84C, two PWDMs 53, a four-port PWDM 93, the LWDM 52, three pump laser diodes 56, and the anti-pump laser diode 57. The amplifier 90 has an attenuator 96 for attenuating anti-pump light, and the blocker 55 for blocking anti-pump light, three isolators 51, a gain flattening filter 99 for flattening the spectral gain profile of the amplifier 90, and a power dump 98. The EDF sections 84A, 84B, and 84C are consecutively optically coupled for signal propagation. The PWDMs 53, 93 and the LWDM 52 are used to couple pump and anti-pump light into the corresponding EDF sections 84A, 84B, and 84C. The anti-pump attenuator 96 and the anti-pump blocker 55 are used to pump different EDF segments at different ratios of optical powers of the pump and the anti-pump light. Control electronics for driving the laser diodes 56 and 57 are omitted in FIG. 9 for clarity.

In operation, an optical signal coupled to the input port 58 propagates consecutively through the EDF segments 84A, 84B, and 84C, being amplified in the first and the third EDF segments 84A and 84C and partially attenuated in the second EDF segment 84B. The first two EDF segments 84A and 84B are pumped with anti-pump light at different power levels, and the third EDF segment 84C is not pumped with anti-pump light. The PWDM 93 is used in conjunction with the power dump 98 to block the preceding pump light from propagating into the EDF segment 84B, and the pump diode 57 is used to pump the EDF segment 84B. This is done to provide independently adjustable pumping levels of the EDF segments 84A and 84B. Alternatively, an attenuator 97 for pump light could be used instead of the laser diode 56, the PWDM 93, and the power dump 98, but in this case the pumping level of the second EDF segment 84B cannot be made higher than the pumping level of the first EDF segment 84A. A skilled artisan will realize that many alternative pumping layouts achieving the goal of independently adjusting pump and anti-pump power levels are possible.

Turning to FIGS. 10A and 10B, graphs of optical gain versus signal power of the amplifier 90 of FIG. 9 at zero and non-zero levels of pumping at an anti-pump wavelength are shown, respectively. VPI™ simulation software was used to obtain the data presented in FIGS. 10A and 10B. The EDF fiber type used in the simulation was MP980. The simulation parameters, including pumping power levels, are listed in Table 1 below.

TABLE 1

| Name in FIG. 9 | Description | Specification | Units |
|---|---|---|---|
| LWDM (52) | L-band WDM | C-band/1570 nm | |
| PWDM (53) | Pump WDM | C-band/980 nm | |
| L-LD (57) | 1570 nm laser | 7 | mW |
| P-LD1 (56) | 980 nm laser | 300 | mW |
| P-LD2 (56) | 980 nm laser | 15 | mW |
| P-LD3 (56) | 980 nm laser | 200 | mW |
| EDF1 (84A) | 4.5 dB/m | 13.1 | m |
| EDF2 (84B) | 4.5 dB/m | 17.5 | m |
| EDF3 (84C) | 4.5 dB/m | 4.5 | m |
| L-stop (55) | 1570 nm stop filter | 50 | dB |
| GFF (99) | Gain flattening filter | | |
| L-Att (96) | 1570 nm attenuator | 13 | dB |

The gain of all three amplification/attenuation stages corresponding to the segments 84A, 84B, and 84C is plotted in FIGS. 10A and 10B as a function of input optical power. One can see that the gain compression is considerably lessened by using the anti-pumping technique, with overall amplifier gain being at least 25 dB.

Figure 11A:
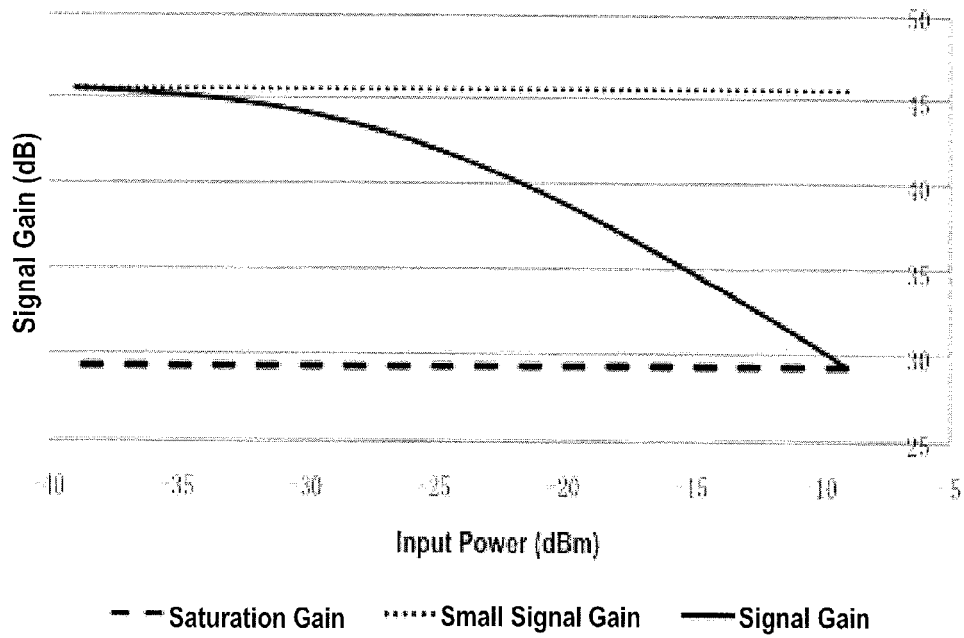
FIGS. 11A and 11B are an expanded-scale graphs of optical gain versus signal power of FIGS. 10A and 10B, respectively.
Figure 11B:
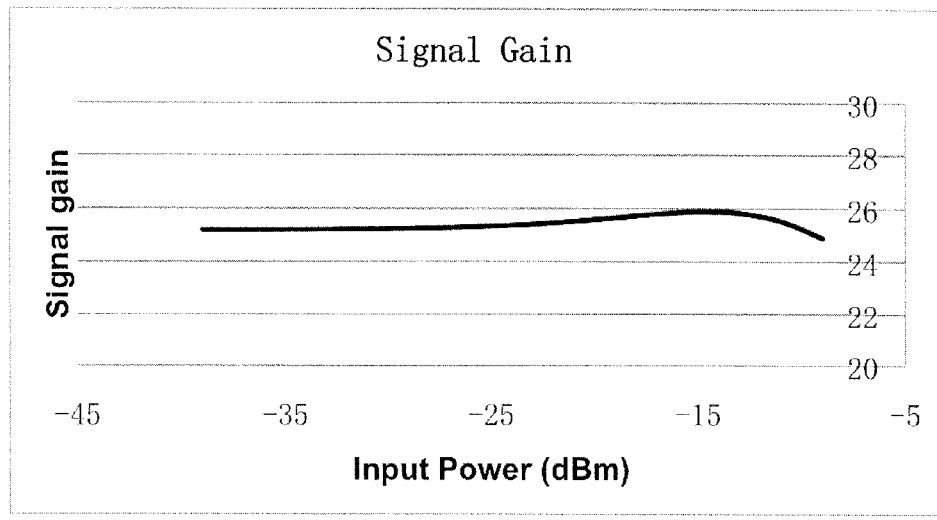

Referring to FIGS. 11A and 11B, expanded-scale plots of calculated optical gain versus signal power of FIGS. 10A and 10B are shown, respectively. FIG. 11A corresponds to the case when the anti-pump laser diode 57 is switched off, and FIG. 11B corresponds to the case when the anti-pump laser diode 57 is switched on. The gain compression of the fiber amplifier 90 with the anti-pump laser diode 57 switched off is about 15 dB. Switching on the anti-pump laser diode 57 reduces the gain variation with the signal power to as little as 1 dB. Because the inversion population is stabilized directly in the method of the present invention, the transient effects and polarization hole burning effects are reduced accordingly.

Figure 12:
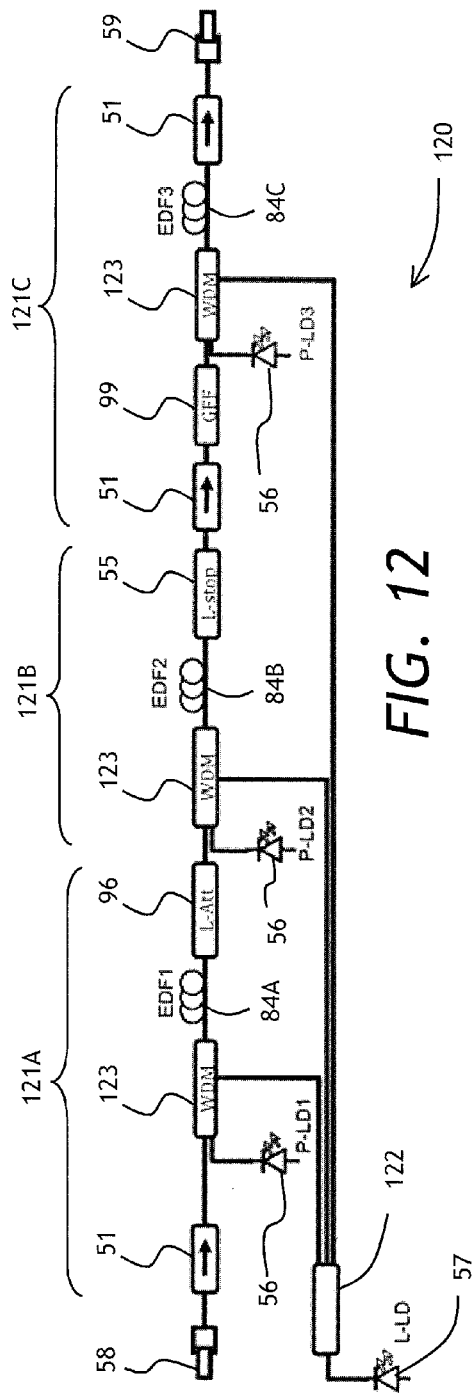
FIG. 12 is a block diagram of an embodiment of a three-stage amplifier of the present invention having a common anti-pump source.

Turning now to FIG. 12, a block diagram of an embodiment of a three-stage amplifier 120 having a single anti-pump source is shown. The three-stage optical fiber amplifier 120 has stages 121A, 121B, and 121C. A 1×3 anti-pump splitter 122 and three four-port WDMs 123 are used to distribute anti-pump light between the three EDF segments 84A, 84B, and 84C of the amplifier 120 while coupling pump light by the pump laser diodes 56. The other optical elements are the same as in the optical amplifier 90 of FIG. 9. The EDF segments 84A, 84B, and 84C correspond to the stages 121A, 121B, and 121C, the stages 121A and 121C being amplification stages, and the stage 121B being a gain compensation stage, or an attenuation stage. In the amplifier 120, the anti-pump light is coupled to all three stages for a better gain compression reduction.

Figure 13:
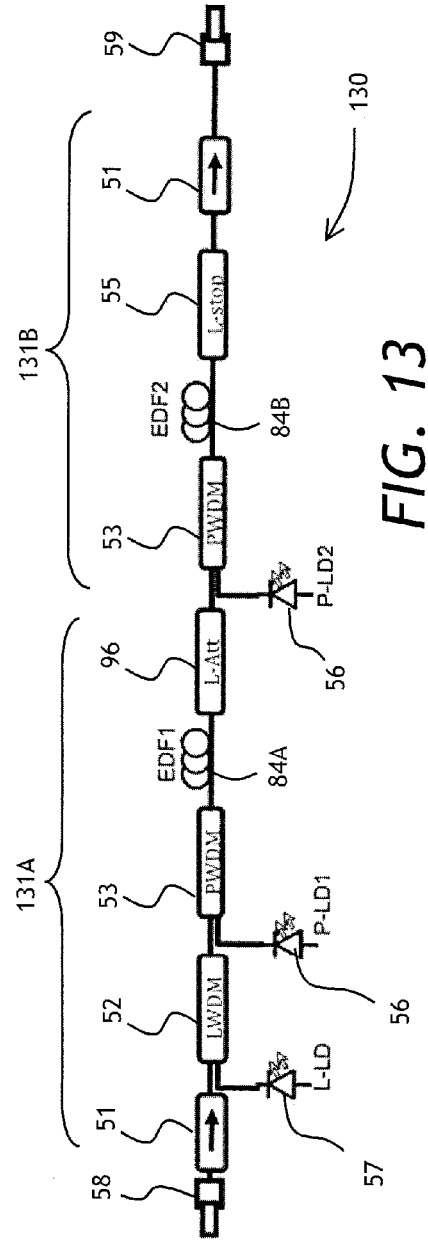
FIG. 13 is a block diagram of a two-stage optical amplifier of the present invention.

Turning to FIG. 13, a simpler two-stage amplifier 130 is shown having two stages 131A and 131B corresponding to the EDF segments 84A and 84B. The anti-pump light emitted by the anti-pump laser diode 57 is coupled to both amplifier stages 131A and 131B using the LWDM 52 and the L-attenuator 96. The other optical elements are the same as in the optical amplifier 120 of FIG. 12. The two EDF segments 84A and 84B are independently pumped with the individual pump laser diodes 56, the directional coupler 53 being disposed between the EDF segments 84A and 84B for delivering the pump power to the second EDF segment 84B. Thus, the EDF segments 84A and 84B are optically coupled to be pumped at different ratios of optical powers of the pump and the anti-pump light. Alternatively, the second EDF 84B could be pumped with an independent anti-pump laser diode through a respective LWDM, not shown. Further, in one embodiment of the invention, the core of the second EDF segment 84B is larger than the core of the first EDF segment 84A, to improve the input optical power range at which the amplifier gain can be stabilized. For further improvement of the optical power range, the second EDF segment 84B can be replaced with a slab of an optical material for free-space propagation of the optical signal therein.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical amplifier for amplifying an optical signal having a signal wavelength and a signal power, the optical amplifier having an amplifier gain, the optical amplifier comprising:
   an optical waveguide doped with a rare earth element;
   an optical pump for pumping the optical waveguide with a pump light, whereby an optical gain at the signal wavelength is created in the optical waveguide, wherein the optical gain is dependent on the signal power; and
   an optical anti-pump for pumping the optical waveguide with an anti-pump light at an anti-pump wavelength longer than the signal wavelength, so as to create a dependence of an optical loss in the optical waveguide on the signal power, substantially compensating the dependence of the optical gain on the signal power and thereby lessening a variation of the amplifier gain with the signal power,
   wherein the optical waveguide has first and second segments optically coupled to be pumped at different ratios of optical powers of the pump and the anti-pump light.

2. The optical amplifier of claim 1, further comprising an optical attenuator disposed in between the first and the second segments of the optical waveguide,
   wherein the optical attenuator has different attenuation coefficients for the pump light and the anti-pump light, so as to provide the different ratios of the optical powers of the pump and the anti-pump light.

3. The optical amplifier of claim 1, further comprising:
   a second optical pump for pumping the optical waveguide with the pump light, and a directional coupler optically coupled to the second optical pump and disposed in between the first and the second segments of the optical waveguide,
   whereby the ratios of the optical powers of the pump and the anti-pump light are different in the first and the second segments of the optical waveguide.

4. The optical amplifier of claim 1, further comprising:
   a second optical anti-pump for pumping the optical waveguide with the anti-pump light, and a directional coupler optically coupled to the second optical anti-pump and disposed in between the first and the second segments of the optical waveguide,
   whereby the ratios of the optical powers of the pump and the anti-pump light are different in the first and the second segments of the optical waveguide.

5. The optical amplifier of claim 1, wherein the optical waveguide further has a third segment optically coupled to the second segment and optically coupled to be pumped with at least one of the pump or the anti-pump light.

6. The optical amplifier of claim 5, wherein the first, the second, and the third segments of the optical waveguide are consecutively optically coupled to form a preamplifier section, a gain compensation section, and a final amplifier section of the optical amplifier.

7. The optical amplifier of claim 1, wherein the anti-pump light has a pre-determined optical power level.

8. The optical amplifier of claim 1, wherein the optical waveguide is an optical fiber.

9. The optical amplifier of claim 1, wherein the rare earth element is selected from the group consisting of erbium, ytterbium, and thallium.

10. The optical amplifier of claim 1, wherein the rare earth element is erbium,
    wherein the pump wavelength is 980+/−20 nm or 1480+/−20 nm, and
    wherein the anti-pump wavelength is between 1565 nm and 1620 nm.

11. The optical amplifier of claim 1,
    wherein the pump is disposed so that in operation, the anti-pump light co-propagates with the optical signal, and
    wherein the optical waveguide amplifier further comprises a wavelength division multiplexor for coupling the anti-pump light and the optical signal into the optical waveguide.

12. An optical amplifier for amplifying an optical signal having a signal wavelength and a signal power, the optical amplifier having an amplifier gain, the optical amplifier comprising:
    an optical medium doped with a rare earth element;
    an optical pump for pumping the optical medium with a pump light, whereby an optical gain at the signal wavelength is created in the optical medium, wherein the optical gain is dependent on the signal power; and
    an optical anti-pump for pumping the optical medium with an anti-pump light at an anti-bump wavelength longer than the signal wavelength, so as to create a dependence of an optical loss in the optical medium on the signal power, substantially compensating the dependence of the optical gain on the signal power and thereby lessening a variation of the amplifier gain with the signal power,
    wherein the optical medium has first and second segments optically coupled to be pumped at different ratios of optical powers of the pump and the anti-pump light; and
    wherein the second segment is a slab of an optical material for propagation of the optical signal therein.

13. A method for lessening a gain compression in an optical amplifier for amplifying an optical signal having a signal wavelength and a signal power, the optical amplifier having a rare earth element doped optical medium and an optical pump for pumping the optical medium at a pump wavelength, for inducing an optical gain in the optical medium, wherein the optical gain exhibits a first variation with the signal power, the method comprising:
    pumping the optical medium at an anti-pump wavelength longer than the wavelength of the optical signal, for inducing a second variation of optical gain with the signal power, which is substantially complementary to the first variation, whereby the gain compression in the waveguide amplifier is lessened, wherein the signal power has a low power sub-range and a high power sub-range, and wherein the anti-pump wavelength and, or the anti-pump optical power level are selected so that in the absence of pumping the optical waveguide at the pump wavelength, attenuation of the optical signal in the low power sub-range is lessened, while attenuation of the optical signal in the high power sub-range is increased.

14. The method of claim 13, wherein in operation, the anti-pump wavelength and, or the pumping power level at the anti-pump wavelength are pre-determined so as to lessen the gain compression for an optical signal having a pre-determined wavelength range and, or a pre-determined signal power range.

15. The method of claim 14, wherein the anti-pump wavelength and, or the pumping power level at the anti-pump wavelength are selected so as to lessen transient effects and, or polarization hole burning effects in the optical amplifier.

16. The method of claim 13, further comprising adjusting the anti-pump wavelength and, or the pumping power level at the anti-pump wavelength based on an average input and, or output signal power.

* * * * *